(12) United States Patent
Leddy, III

(10) Patent No.: US 11,526,888 B2
(45) Date of Patent: Dec. 13, 2022

(54) RELYING PARTY RISK-ADJUSTED INDICATOR SYSTEM AND METHOD

(71) Applicant: Visa International Service Association, San Francisco, CA (US)

(72) Inventor: William Joseph Leddy, III, Lakeway, TX (US)

(73) Assignee: Visa International Service Association, San Francisco, CA (US)

( * ) Notice: Subject to any disclaimer, the term of this patent is extended or adjusted under 35 U.S.C. 154(b) by 620 days.

(21) Appl. No.: 16/672,950

(22) Filed: Nov. 4, 2019

(65) Prior Publication Data

US 2021/0133750 A1  May 6, 2021

(51) Int. Cl.
*G06Q 20/40* (2012.01)
*G06Q 20/38* (2012.01)
*G06Q 20/32* (2012.01)

(52) U.S. Cl.
CPC ..... *G06Q 20/4016* (2013.01); *G06Q 20/3227* (2013.01); *G06Q 20/385* (2013.01); *G06Q 20/38215* (2013.01)

(58) Field of Classification Search
CPC .......... G06Q 20/4016; G06Q 20/3227; G06Q 20/38215; G06Q 20/385
See application file for complete search history.

(56) References Cited

U.S. PATENT DOCUMENTS

| | | | | |
|---|---|---|---|---|
| 2014/0358789 A1* | 12/2014 | Boding | ................ | G06Q 20/405 705/44 |
| 2015/0120559 A1* | 4/2015 | Fisher | ................ | G06Q 20/3224 705/44 |
| 2020/0111037 A1* | 4/2020 | Mondal | ................. | H04W 4/025 |

* cited by examiner

*Primary Examiner* — Chau Le
(74) *Attorney, Agent, or Firm* — The Webb Law Firm

(57) ABSTRACT

A method and system capable of generating a relying party risk-adjusted indicator associated with and used by users and parties entering into one or more transactions with a relying party.

18 Claims, 11 Drawing Sheets

Blockchain Database

| Hash of the Block ||||||
|---|---|---|---|---|---|
| Block N Header ||||||
| Verson N | Hash(N-1)Block || Timestamp | Nonce | Hash |
| Block Body ||||||
| Block # | Party ||| Proof-of-Identity ||
| Transaction History |||| Relying Party Risk-Adjusted Indicator ||
| Party Link || Transaction Information ||| other |

FIG. 5A

Relational Database

|  | Transaction 1 |  | Transaction N |
|---|---|---|---|
| Proof-of-Identity | Link 1 | ... | Link N |
| Party | Link 1 | ... | Link N |
| Relying Party Risk-Adjusted Indicator | Link 1 | ... | Link N |
| Party Link | Link 1 | ... | Link N |
| Transaction Information | Link 1 | ... | Link N |
| Transaction History | Link 1 | ... | Link N |

FIG. 5B

RELYING PARTY RISK-ADJUSTED INDICATOR SYSTEM AND METHOD

BACKGROUND

1. Technical Field

This disclosure is related to systems and methods used to transfer identity trust and identity information using a risk evaluated identifier.

2. Technical Considerations

Transaction systems require user verification. Verification may take the form of the user providing a proof-of-identity. Such a proof may take the form of a government proof-of-identity credential or document (e.g., a social security number, a driver's license, or passport) that the user sends to the system.

Risk assessments are often undertaken to determine what potential risk a transacting user poses for a party conducting the transaction (referred to hereafter as a "party" or as a "relying party"). For example, payment systems may use a user's transaction history as an input into a risk model to estimate the likelihood a user may fulfill or default on a payment. Similarly, banks and loan agencies may use a user's credit history as a factor in its decision to make or not make a new loan. Payment systems may use user device information to recognize returning users over time and to detect attempts to spoof the user's identity. In such cases, the assessed risk is related to the transaction to be conducted. It does not necessarily index potential risks a user may pose to one or more classes of transaction that may be entered into.

SUMMARY

Accordingly, and generally, the present disclosure provides illustrative, non-limiting expressions, embodiments, or aspects of improved apparatus, systems and methods that address the transfer of user information and the creation by a relying party risk-adjusted indicator system of at least one relying party risk-adjusted indicator that may be associated with the information transferred. While a unique transaction identifier may be generated for each transaction that may be used by a user for entering into or conducting at least one transaction, the risk the user presents to a relying party with it may vary with the at least one transaction being entered into. A relying party risk-adjusted indicator system may determine a relying party risk-adjusted indicator that may be used by the party issuing a requested account or conducting the at least one transaction to determine their transactional risk before issuing the account or conducting the at least one transaction and may be used by the relying party in support of a decision to approve or reject issuing the account or entering into or conducting the transaction with the user.

In some non-limiting expressions, embodiments, or aspects, provided is a relying party risk-adjusted indicator generation system, comprising: at least one computing device programmed or configured to: receive at least one account or transaction request from at least one user to enter into a transaction with at least one relying party; receive at least one proof-of-identity from the at least one user; generate at least one one-time transaction identifier; access data associated with the at least one user; generate at least one risk signifier associated with the at least one user based on the accessed data; generate at least one relying party risk-adjusted indicator comprising the at least one risk signifier and the at least one one-time transaction identifier; communicate the at least one one-time transaction identifier to the at least one user; and communicate the at least one relying party risk-adjusted indicator to the at least one relying party to the transaction.

In some non-limiting expressions, embodiments, or aspects, the at least one computing device of the relying party risk-adjusted indicator generation system is programmed or configured to: receive the at least one one-time transaction identifier from the at least one user; and authenticate the at least one user and proceed with the at least one transaction. In some non-limiting expressions, embodiments, or aspects, the at least one transaction comprises at least one of the following: requesting an account, conducting a transaction, or any combination thereof.

In some non-limiting expressions, embodiments, or aspects, the at least one risk signifier is based on at least one of the following: at least one device fingerprint, at least one location, at least one transaction history, at least one risk score from at least one risk model, at least one assertion profile associated with the at least one user, at least a partial match of the at least one proof-of-identity provided by the at least one user with at least one stored proof-of-identity previously received from the at least one user, or any combination thereof. In some non-limiting expressions, embodiments, or aspects, the at least one risk signifier is communicated as at least one of the following appended to or concatenated with a one-time transaction identifier: a number, an alphanumeric, a symbol, a minus sign, a plus sign, an equal sign, or any combination thereof.

In some non-limiting expressions, embodiments, or aspects, the at least one one-time transaction identifier and the at least one risk signifier are both numbers, which are combined to determine or generate the relying party risk-adjusted indicator using at least one of the following: multiplication, division, addition, a non-linear expression, a result normalized in relation to a predefined scale, a hashed number, an encrypted number, or any combination thereof. In some non-limiting expressions, embodiments, or aspects, the data associated with the at least one relying party risk-adjusted indicator is stored in at least one of the at least one computing device's storage devices in at least one of the following: on a block chain, in a relational database, a hierarchical database, an object-oriented database, a graphical database, or any combination thereof. In some non-limiting expressions, embodiments, or aspects, the at least one proof-of-identity comprises at least one of the following: at least one device identifier, a device fingerprint, a phone number, a location identifier, a home, a business, a mailing address, an assertion profile, at least one assertion known or not known about the user, a government identifier, a social security number, a driver's license, an authorized photo, a passport, a government furnished identity card or tag, or any combination thereof.

In some non-limiting expressions, embodiments, or aspects, the at least one risk signifier comprises output of at least one risk model computing the risk of the at least one transaction using at least one of the following: at least one user's payment, an agreement, an assertion, a compromise-event reference identifier, a compromise event history, data from at least one risk source, a credit bureau, a government agency or department, or any combination thereof. In some non-limiting expressions, embodiments, or aspects, the at least one computing device of the relying party risk-adjusted indicator generation system is programmed or configured to generate a relying party risk-adjusted indicator by combining the at least one one-time transaction identifier with a risk signifier associated with the risk the at least one user poses to the at least one relying party for the at least one transaction to be conducted.

In some non-limiting expressions, embodiments, or aspects, provided is a relying party risk-adjusted indicator generation method, comprising: receiving, with at least one computing device, at least one account or transaction request from at least one user to enter into at least one transaction with at least one party; receiving, with at least one computing device, at least one proof-of-identity from the at least one user; generating, with at least one computing device, at least one one-time transaction identifier; accessing, with at least one computing device, data associated with the at least one user; generating, with at least one computing device, at least one risk signifier associated with the data; generating, with at least one computing device, at least one relying party risk-adjusted identifier comprising the at least one risk signifier and the at least one one-time transaction identifier; communicating, with at least one computing device, the at least one one-time transaction identifier to the at least one user; and communicating, with at least one computing device, the at least one relying party risk-adjusted indicator to the at least one relying party to the transaction.

In some non-limiting expressions, embodiments, or aspects, the method further comprises generating, with at least one computing device, a relying party risk-adjusted indicator by combining the at least one one-time transaction identifier with at least one risk signifier associated with the risk the at least one user poses to the relying party for the at least one transaction to be conducted. In some non-limiting expressions, embodiments, or aspects, the at least one risk signifier is based on at least one of the following: at least one device fingerprint, a location, at least one transaction history, at least one risk score from at least one risk model, at least one assertion profile associated with the at least one user, at least a partial match of the at least one proof-of-identity that the at least one user provides with at least one stored proof-of-identity previously received from the at least one user, or any combination thereof. In some non-limiting expressions, embodiments, or aspects, the at least one risk signifier is communicated as at least one of the following appended to or concatenated with a one-time transaction identifier: a number, an alphanumeric, a symbol, a minus sign, a plus sign, an equal sign, or any combination thereof.

In some non-limiting expressions, embodiments, or aspects, the at least one one-time transaction identifier and the at least one risk signifier are both numbers, which are combined to determine or generate at least one relying party risk-adjusted indicator using at least one of the following: multiplication, division, addition, a non-linear expression, a result normalized in relation to a predefined scale, a hashed number, an encrypted number, or any combination thereof. In some non-limiting expressions, embodiments, or aspects, the data associated with the at least one relying party risk-adjusted indicator is stored in the at least one computing device's storage device in at least one of the following: on a block chain, in a relational database, a hierarchical database, an object-oriented database, a graphical database, or any combination thereof.

In some non-limiting expressions, embodiments, or aspects, the at least one proof-of-identity comprises at least one of the following: at least one device identifier, a device fingerprint, a phone number, a location identifier, a home, a business, a mailing address, an assertion profile, at least one assertion known or not known about the user, a government identifier, a social security number, a driver's license, an authorized photo, a passport, a government furnished identity card or tag, or any combination thereof. In some non-limiting expressions, embodiments, or aspects, the at least one risk signifier comprises output of at least one risk model computing the risk of the at least one transaction using at least one of the following: at least one user's payment, an agreement, an assertion, a compromise-event reference identifier, a compromise event history, data from at least one risk source, a credit bureau, a government agency or department, or any combination thereof.

Further non-limiting expressions, embodiments, or aspects are set forth in the following numbered clauses.

Clause 1: A relying party risk-adjusted indicator generation system, comprising: at least one computing device programmed or configured to: receive at least one account or transaction request from at least one user to enter into a transaction with at least one relying party; receive at least one proof-of-identity from the at least one user; generate at least one one-time transaction identifier; access data associated with the at least one user; generate at least one risk signifier associated with the at least one user based on the accessed data; generate at least one relying party risk-adjusted indicator comprising the at least one risk signifier and the at least one one-time transaction identifier; communicate the at least one one-time transaction identifier to the at least one user; and communicate the at least one relying party risk-adjusted indicator to the at least one relying party to the transaction.

Clause 2: The relying party risk-adjusted indicator generation system of clause 1, wherein the at least one computing device of the relying party risk-adjusted indicator generation system is programmed or configured to: receive the at least one one-time transaction identifier from the at least one user; and authenticate the at least one user and proceed with the at least one transaction.

Clause 3: The relying party risk-adjusted indicator generation system of clause 1 or 2, wherein the at least one transaction comprises at least one of the following: requesting an account, conducting a transaction, or any combination thereof.

Clause 4: The relying party risk-adjusted indicator generation system of any of clauses 1-3, wherein the at least one risk signifier is based on at least one of the following: at least one device fingerprint, at least one location, at least one transaction history, at least one risk score from at least one risk model, at least one assertion profile associated with the at least one user, at least a partial match of the at least one proof-of-identity provided by the at least one user with at least one stored proof-of-identity previously received from the at least one user, or any combination thereof.

Clause 5: The relying party risk-adjusted indicator generation system of any of clauses 1-4, wherein the at least one risk signifier is communicated as at least one of the following appended to or concatenated with a one-time transaction identifier: a number, an alphanumeric, a symbol, a minus sign, a plus sign, an equal sign, or any combination thereof.

Clause 6: The relying party risk-adjusted indicator generation system of any of clauses 1-5, wherein the at least one one-time transaction identifier and the at least one risk signifier are both numbers, which are combined to determine or generate the relying party risk-adjusted indicator using at least one of the following: multiplication, division, addition, a non-linear expression, a result normalized in relation to a predefined scale, a hashed number, an encrypted number, or any combination thereof.

Clause 7: The relying party risk-adjusted indicator generation system of any of clauses 1-6, wherein the data associated with the at least one relying party risk-adjusted indicator is stored in at least one of the at least one computing device's storage devices in at least one of the following: on a block chain, in a relational database, a hierarchical database, an object-oriented database, a graphical database, or any combination thereof.

Clause 8: The relying party risk-adjusted indicator generation system of any of clauses 1-7, wherein the at least one proof-of-identity comprises at least one of the following: at least one device identifier, a device fingerprint, a phone number, a location identifier, a home, a business, a mailing address, an assertion profile, at least one assertion known or not known about the user, a government identifier, a social security number, a driver's license, an authorized photo, a passport, a government furnished identity card or tag, or any combination thereof.

Clause 9: The relying party risk-adjusted indicator generation system of any of clauses 1-8, wherein the at least one risk signifier comprises output of at least one risk model computing the risk of the at least one transaction using at least one of the following: at least one user's payment, an agreement, an assertion, a compromise-event reference identifier, a compromise event history, data from at least one risk source, a credit bureau, a government agency or department, or any combination thereof.

Clause 10: The relying party risk-adjusted indicator generation system of any of clauses 1-9, wherein the at least one computing device of the relying party risk-adjusted indicator generation system is programmed or configured to generate a relying party risk-adjusted indicator by combining the at least one one-time transaction identifier with a risk signifier associated with the risk the at least one user poses to the at least one relying party for the at least one transaction to be conducted.

Clause 11: A relying party risk-adjusted indicator generation method, comprising: receiving, with at least one computing device, at least one account or transaction request from at least one user to enter into at least one transaction with at least one party; receiving, with at least one computing device, at least one proof-of-identity from the at least one user; generating, with at least one computing device, at least one one-time transaction identifier; accessing, with at least one computing device, data associated with the at least one user; generating, with at least one computing device, at least one risk signifier associated with the data; generating, with at least one computing device, at least one relying party risk-adjusted identifier comprising the at least one risk signifier and the at least one one-time transaction identifier; communicating, with at least one computing device, the at least one one-time transaction identifier to the at least one user, and communicating, with at least one computing device, the at least one relying party risk-adjusted indicator to the at least one relying party to the transaction.

Clause 12: The relying party risk-adjusted indicator generation method of clause 11, further comprising generating, with at least one computing device, a relying party risk-adjusted indicator by combining the at least one one-time transaction identifier with at least one risk signifier associated with the risk the at least one user poses to the relying party for the at least one transaction to be conducted.

Clause 13: The relying party risk-adjusted indicator generation method of clause 11 or 12, wherein the at least one risk signifier is based on at least one of the following: at least one device fingerprint, a location, at least one transaction history, at least one risk score from at least one risk model, at least one assertion profile associated with the at least one user, at least a partial match of the at least one proof-of-identity that the at least one user provides with at least one stored proof-of-identity previously received from the at least one user, or any combination thereof.

Clause 14: The relying party risk-adjusted indicator generation method of any of clauses 11-13, wherein the at least one risk signifier is communicated as at least one of the following appended to or concatenated with a one-time transaction identifier: a number, an alphanumeric, a symbol, a minus sign, a plus sign, an equal sign, or any combination thereof.

Clause 15: The relying party risk-adjusted indicator generation method of any of clauses 11-14, wherein the at least one one-time transaction identifier and the at least one risk signifier are both numbers, which are combined to determine or generate at least one relying party risk-adjusted indicator using at least one of the following: multiplication, division, addition, a non-linear expression, a result normalized in relation to a predefined scale, a hashed number, an encrypted number, or any combination thereof.

Clause 16: The relying party risk-adjusted indicator generation method of any of clauses 11-15, wherein the data associated with the at least one relying party risk-adjusted indicator is stored in the at least one computing device's storage device in at least one of the following: on a block chain, in a relational database, a hierarchical database, an object-oriented database, a graphical database, or any combination thereof.

Clause 17: The relying party risk-adjusted indicator generation method of any of clauses 11-16, wherein the at least one proof-of-identity comprises at least one of the following: at least one device identifier, a device fingerprint, a phone number, a location identifier, a home, a business, a mailing address, an assertion profile, at least one assertion known or not known about the user, a government identifier, a social security number, a driver's license, an authorized photo, a passport, a government furnished identity card or tag, or any combination thereof.

Clause 18: The relying party risk-adjusted indicator method of any of clauses 11-17, wherein the at least one risk signifier comprises output of at least one risk model computing the risk of the at least one transaction using at least one of the following: at least one user's payment, an agreement, an assertion, a compromise-event reference identifier, a compromise event history, data from at least one risk source, a credit bureau, a government agency or department, or any combination thereof.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

The drawings incorporated herein illustrate one or more non-limiting expressions, embodiments, or aspects of a relying party risk-adjusted indicator system apparatus, system, and method that help explain different aspects of the one or more expressions of the same. As such, the descriptions and drawings are not to be viewed as limiting any one aspect of any expression, embodiment, or aspect of the one-time risk adjustment identity system's apparatus, systems, and methods. In the drawings:

FIGS. 5A-5E are non-limiting expressions, embodiments, or aspects of database structures according to the principles of the present disclosure.

DETAILED DESCRIPTION

Figure 1:
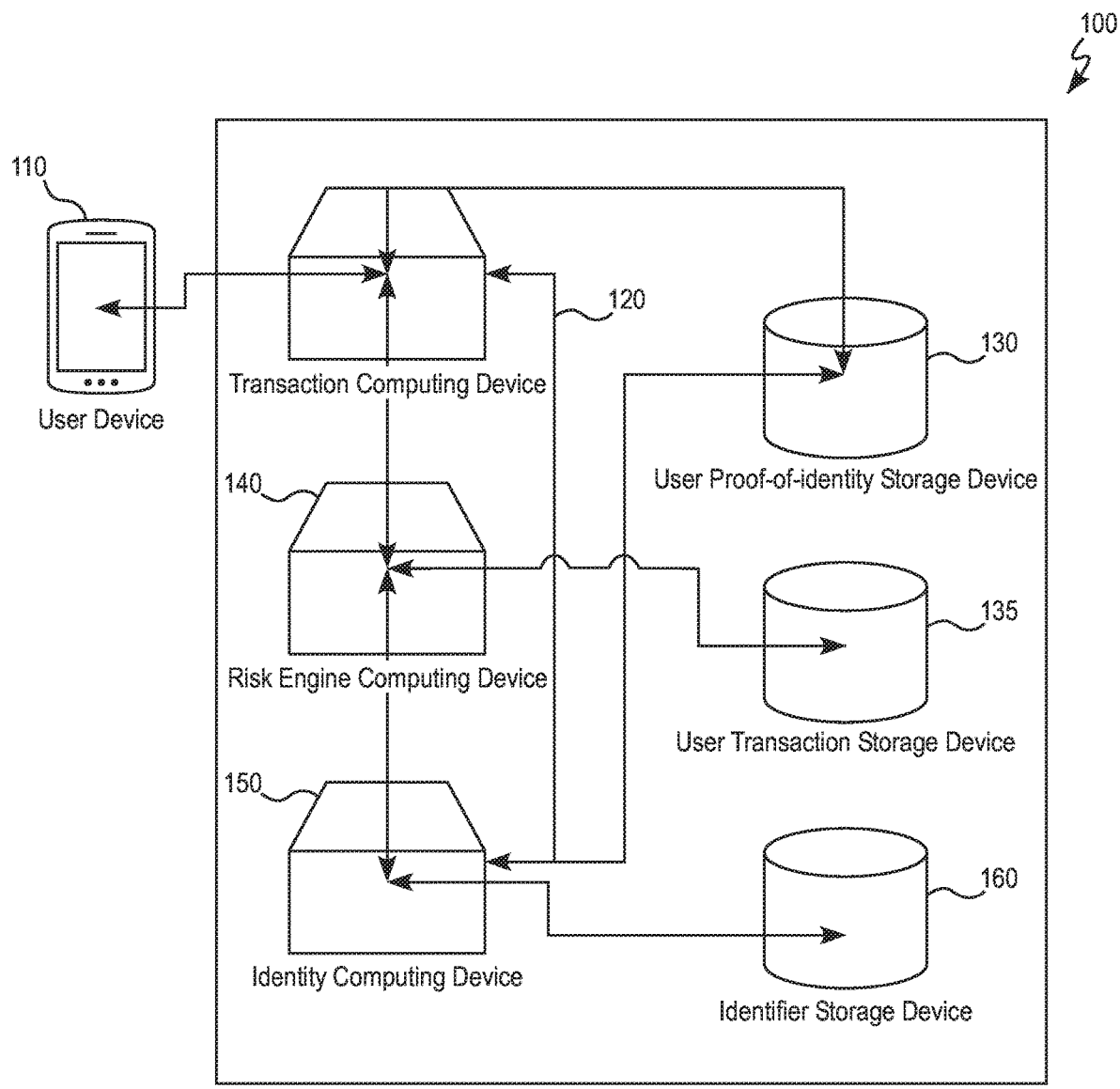
FIG. 1 is a non-limiting expression, embodiment, or aspect of system elements according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to expressions of the disclosure as it is oriented in the drawing figures. However, it is to be understood that the expressions, embodiments, or aspects of the disclosure may assume various alternative variations, computing device and storage device configurations within or among different parties and step sequences, except where expressly specified to the contrary. It is also to be understood that devices, computing device and storage device configurations, and processes illustrated in the attached drawings, and described in the following specification, are simply exemplary expressions, embodiments, or aspects of the disclosure. Hence, specific dimensions, configurations, and other physical characteristics related to the expressions, embodiments, or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "identifier" refers to a unique identifier associated with an individual that may be validated to confirm the individual when checking an identity.

As used herein, the term "transaction" refers to an interaction between a user and a relying party, wherein the interaction pertains to making a payment, providing access to a restricted event or area, generating a legally binding contract or agreement, or establishing any other type of arrangement wherein the party wants to understand the risk associated with entering into a transaction requiring a trust relationship with the user.

As used herein, the term "one-time transaction identifier" refers to an identifier that may be valid for a pre-determined period of time, or an identifier that may only be used one time, or to an identifier that is issued one time, may be unchanging, and used always.

As used herein the term "assertion" refers to a factual true/false or yes/no statement about a user, or a combination thereof. For example, an assertion may indicate that a user is above a certain age, is a mortgage holder, and/or has held a bank account for a pre-defined period of time. In each case the assertion indicator may be "true" or "yes" or "false" or "no" or words to such effect which, when there is more than one assertion, may be taken in aggregate, or may comprise an assertion profile of a user requesting or entering into a transaction, or any combination thereof.

As used herein, the term "assertion profile" refers to digital representation or profile of a user that is formed by information about the user and the user's activities without exposing information that enables the specific user to be uniquely identified.

As used herein the term "user" may refer to a person, a public or private company, or government agency. Collectively they may be referred to as "their" in the disclosure and claims that follow.

As used herein the term "party or relying party" refers to a person, private or public company or entity (e.g., an issuer, processor, or merchant), or government agency that uses a risk-adjusted transaction identifier to decide whether to enter a transaction with a user. In some circumstances, the party is considered to be a "relying party," e.g., one who relies on a risk-adjusted identifier to decide if the user is one with whom it may want to transact.

As used herein, the term "processor" refers to an entity capable of issuing a one-time risk adjusted identifier. Examples may comprise at least one of the following: an issuer, a smart contract processor, a payment processor, an acquiring processor, or a government processor. The processor may be the same party as the one whom the transaction is being conducted or it may be an independent party not associated with the specific transaction being conducted including, but not limited to, a third-party processor or a party whose business or service includes the creation of one-time verification risk-adjusted identifiers. The latter may include but not be limited to a government agency, or a private or public profit or non-profit corporation.

As used herein, the term "identity service" refers to an entity capable of verifying or providing identity information for an individual or object. Examples may include, but are not limited to, a bank, an employer, a government agency or department (which may include, but not be limited to, a motor vehicle department, a revenue service, or registration service), or insurance provider.

As used herein, the terms "matching" and "partially matching" refer to software or algorithms which may compare two acoustic, optical, and/or alphanumeric patterns to determine if the two patterns comprise the same pattern in accordance with a predetermined threshold. If the result equals or exceeds the threshold, the patterns are determined to "match" or "partially match." The matching or partially matching software may include, but not be limited to, voice recognition, optical character matching, alphanumeric pattern matching programs, or any combination thereof.

As used herein, the term "proof-of-identity" may include, but not be limited to, at least one device identifier (for example, a device fingerprint or phone number), location identifier (for example, a home or business, or other mailing address), an assertion profile (comprising what assertions are known or not known about the user), government identifier (for example, a social security number or a driver's license), an authorized photo (for example, from a passport, a driver's license, or a government furnished identity card or tag), or any combination thereof.

As used herein, the term "relying party risk-adjusted indicator" refers to at least one indicator of the risk a user may pose to a relying party with respect to the account being requested or the transaction being entered into. The indicator may be generated using a one-time transaction identifier and a risk signifier that itself may be generated based on risk data available to an identity service.

According to some non-limiting expressions, embodiments, or aspects, FIG. 1 depicts at least one processor's system 100 for generating and conveying at least one one-time transaction identifier associated with a user to the user. The example components system 100 may be implemented at least partially by hardware at one or more computing devices, which may include, but not be limited to, one or more hardware computing devices executing software instructions stored in one or more storage devices for performing the functions that are described herein. Or, one or more virtual machine instances in a shared computing facility may be used, for example, but not limited to a cloud computing center. System 100 illustrates only one of many possible arrangements of components configured to execute the programming described herein. Other arrangements may include fewer or different components, and the division of work between the components may vary depending on the arrangement.

Software instructions, when stored in a storage device accessible to a computer device, render the computing device into a special-purpose computing device that is customized to perform the operations specified in the software instructions. The terms "software," "software instructions," "computer program," "computer-executable instructions," and "computing device-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

While functions and operations of the example embodiment(s) may be implemented entirely with software instructions, hard-wired or programmable circuitry of a computing device (e.g., an ASIC, an FPGA, or the like) may be used in some non-limiting expressions, embodiments, or aspects in place of or in combination with software instructions to perform the functions, according to the requirements of the particular implementation at hand.

The user may use at least one user device 110 to request an account or enter into at least one transaction with at least one party, initiate at least one transaction with at least one relying party, enroll their at least one identity information, or any combination thereof, with at least one system 100 using strong authentication that is used by the at least one party to enter into, initiate, accept, conduct, or any combination thereof the at least one transaction.

User device 110 may include, but not be limited to, a mobile phone, tablet, laptop computer, desk computer, wearable device, or any other device owned by the user capable of communicating with system 100. The user may enroll his or her identity information using an input device or interface associated with user device 110. The input device or interface may include, but not be limited to, a physical or digital keyboard, a touch panel, a voice input or recognition system, a cursor control device that may include, but not be limited to, a trackball, mouse, or touchpad, or functionally equivalent input device or interface. The strong authentication may include, but not be limited to, a one-time password, certificate-based authentication, context-based authentication, multi-factor authentication, two-factor authentication, challenge-response authentication, cryptographic processes, or any combination thereof.

System 100 may comprise one or more computing devices, one or more storage devices, and one or more means to communicate among and between the devices. A computing device may be a general purpose microprocessor, a system on a chip, a mainframe computer, a cloud-based server, or any hardware capable of performing the programs required by system 100. A computing device may also communicate with another computing device or at least one storage device using a coupled wired or optical bus, a wireless channel capability to communicate with at least one computer or storage device, or any combination thereof. Wireless channels may include, but not be limited to, wireless data networks and protocols (e.g., third-generation (3G), fourth-generation (4G), fifth-generation, (5G), Long-term Evolution (LTE), and other predecessor, future generation or similar networks), Local Area Net (LAN) networks based on the IEEE 802.11x standard (Wi-Fi®), Bluetooth® Based on Bluetooth® Special Interest (SIT) Standards, Wide Area Net (WAN) networks based on the IEEE 802.16 set of standards (Wi-Max), Broadband B-ISDN, TCP/IP (which as a minimum may include, but not be limited to, the Internet Protocol (IP), Address Resolution Protocol (ARP), Internet Control Message Protocol (ICMP), Transmission Control Protocol (TCP), User Datagram Protocol (UDP), Internet Group Management Protocol (IGMP), Neighbor Discovery Protocol (NDP), ICMPv6, and IGMPv6 and an integrated IPSec security layer), Simple Message Transfer Protocol (SMTP), FileTransfer Protocol (FTP), Code-Division Multiple Access (CDMA) protocol, Global System for Mobile (GSM) protocol, or any such preceding or future networks that may provide access to a network, which may include, but not be limited to the Internet, a private network, or another device.

A storage device may be a random access memory (RAM) or other dynamic storage device for storing information and software instructions to be executed by a computing device, read-only memory (ROM), or other static storage device for storing static information and software instructions for computing devices, or a mass storage device for storing information and software instructions on fixed or movable media, which may include, but not be limited to, magnetic, optical, solid-state, magnetic-optical, flash memory, or any other available mass storage technology.

A storage device may use any one or more storage media, including but not limited to, any non-transitory media that store data, software instructions, or both and that cause a computing device to operate in a specific fashion. Such storage media may comprise non-volatile media, volatile media, or both. Non-volatile media may include, but not be limited to, non-volatile random access memory (NVRAM), flash memory, optical disks, magnetic disks, or solid-state drives. Volatile media may include, but not be limited to, dynamic memory that serves as main memory. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, and/or any other memory chip or cartridge.

The above-described computer hardware and software is presented for the purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Representative proofs-of-identity may include, but not be limited to, a photo of the user, an image of, or information taken from, government provided proof-of-identity credential or document (including, but not limited to, a social security number, driver license, passport, or tax identification number), a biometric, a secret code known only between the user and the party (including, but not limited to, a password, PIN, or passcode), at least one assertion which may comprise an assertion profile, one or more know-your-customer datum that a user authorizes be used for identification or assertion purposes, or any combination thereof.

System 100 may comprise at least one transaction computing device 120, at least one risk engine computing device 140, at least one identity computing device 150, at least one user proof-of-identity storage device 130, at least one user transaction storage device 135, and at least one identifier storage device 160. It is recognized that depending on the design of system 100, the computing devices may be one or more different devices or the same device and that the storage devices may be one or more different devices or the same device.

The proof-of-identity provided by the user may be received by transaction computing device 120, in response to which it may be sent to identity computing device 150 to at least partially match at least one previously stored proof-of-identity for the user that it may access from user proof-of-identity storage device 130. The at least partial match results may then be sent to a risk engine computing device 140 where the at least partial match results may be evaluated in conjunction with other risk related information related to the user that it may request and receive from a transaction storage device 135.

Transaction storage device 135 stores the user's transaction history. The user's transaction history may comprise a series of at least one historical transaction, at least one possible index associated with the user's history comprising numbers, user device information, event logs, measures of the user's acceptances and declines, at least one risk score associated with the least one previous transaction or index, or any combination thereof. The at least one risk score may be an output of at least one fraud model that measures or predicts the likelihood that one or more past transactions were considered fraudulent. Associated with the at least one risk score may be at least one risk condition code that may provide information on the nature and magnitude of risk associated with the transaction, a compromise event reference ID that may identify a specific compromise event related to the transaction, or both.

The risk score may be an indication of the degree of risk that a user poses to the party for the requested account or for the transaction the user wants to enter into and/or conduct with the party. It may be represented by a least one risk model's result. The results may come from at least one risk model associated with a user's payments, agreements previously entered into, assertions that are valid or invalid, or any combination thereof. The risk models used may include, but not be limited to, those that may be based on Bayesian statistics or statistical regression, decision trees, random forests, regularized logistic regression, machine-learning based artificial intelligence models, or any combination thereof that may be used to determine fraud, credit card, or other financial, transactional, or contractual risks. Additional risk related information that may be used separately or incorporated into an appropriate model may include, but not be limited to, at least one compromise event reference identifier, specific compromise event, or datum from some other risk source including, but not limited to, a credit bureau, a government agency, financial institution, or any combination thereof to which the party may have access.

Risk engine computing device 140 may use the user's transaction history and the at least one risk score, or risk condition code, or compromise event reference ID or device information or any combination thereof that may be associated with it, at least one decision rule used in conjunction with such data, or any combination thereof, to determine and output a degree of risk that the user may pose for the party should the party accept the user's transaction request. The degree of risk may be signified by a risk signifier, which may comprise as a number (for example, from 1 to 100), a score expressed as a percentage, a qualifier (for example, high, medium, low), a symbol (for example, a plus sign for acceptable risk, a minus sign for unacceptable risk, or an equal sign for indeterminate or neutral risk), and any possible combination thereof.

The risk signifier output by risk engine computing device 140 may be sent to a one-time transaction identifier computing device 150 to create a one-time transaction identifier for the user to use with the at least the one transaction. The one-time transaction identifier may be a one-time alphanumeric identifier that may be sent to the user's device 110 and simultaneously sent to and stored in identifier storage device 160.

The at least one one-time transaction identifier may be combined with the risk signifier generated by risk engine computing device 140 that is related to the user for the at least one requested transaction to generate at least one relying party risk-adjusted indicator, which going forward will simply be referred to as a relying party risk-adjusted indicator. It too may have a one-time use for the specific transaction for which it may be generated; it may also be saved and reused. The use or reuse of the indicator may depend on the use criteria or decision logic used by the relying party.

The at least one one-time risk-adjusted indicator may be stored in an identifier storage device 160 in any number of ways that may be specified for the storage device in accordance with the data structure of the storage device. Storage device databases may include, but not be limited to, a relational, block chain, or distributed ledger, object-oriented, hierarchical, or graphical database, or any combination thereof. Consider the following illustrative non-limiting examples wherein the relying party risk-adjusted indicator may be represented as a relational element in a relational database with pointers associated with the user, as a block on a block chain, or in a table structure wherein the one-time transaction identifier and risk signifier may be appended or concatenated data elements, or both, that may comprise at least one new data element which, then, may also be hashed or otherwise encrypted. Non-limiting illustrative expressions, embodiments, or aspects of these types of database structures are further described below in the discussion of FIGS. 5A-5E.

If both a one-time transaction identifier and a degree-of-risk signifier are both numerical, then their combination may also be expressed as the result of at least one mathematical equation, comprising at least one of the following: a multiplication, division, addition, or non-linear expression of the two numbers which may or may not then be normalized in relation to some predefined scale, which may then also be hashed or otherwise encrypted, or any combination thereof.

Note, however, that the relying party risk-adjusted indicator may be stored in identifier storage device 160, and the user may only receive the one-time transaction identifier without any indication of the risk associated with it. That is, the risk adjustment associated with the one-time transaction identifier that in combination with the at least one associated risk signifier may generate a relying party risk-adjusted indicator may only be communicated to and known by the relying party from whom the user requested an account or with whom the transaction may be conducted. The user may not receive or be notified of a degree-of-risk determination or how it is being signified for or to the relying party.

The computing and storage devices described heretofore may be a party's or owned, managed, and maintained by an independent service provider to the party, or represent some combination of thereof. If a service provider is involved, then it may convey one or more results of its processing to the relying party The party may use the signified degree-of-risk to proceed with the account or transaction by requiring the user to respond to and correctly answer a challenge question using user device 110 before agreeing to proceed with the account or the transaction, or by declining issuing the account or entering into the transaction. The challenge question may include, but not be limited to, asking for a password or an answer to a personal question or any combination thereof, wherein the password, answer, or any combination thereof may have been submitted by the user and stored in at least one of system 100 storage device represented in FIG. 1.

Figure 2:
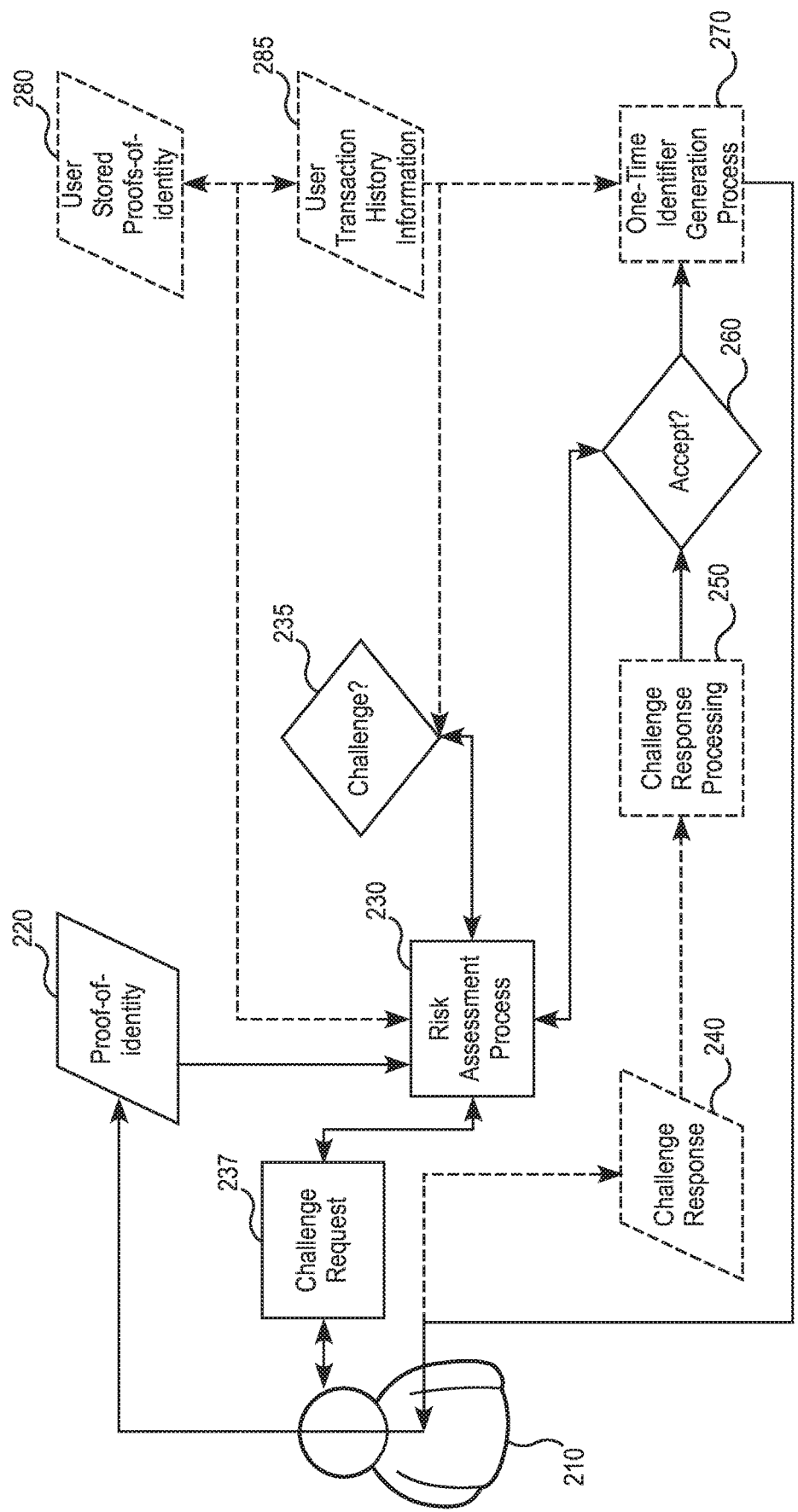
FIG. 2 is a non-limiting expression, embodiment, or aspect of processing according to the principles of the present disclosure.

According to some non-limiting expressions, embodiments, or aspects, FIG. 2 illustrates processes that may be required to create a relying party risk-adjusted indicator. A user 210 may provide at least one proof-of-identity 220 to request an account or initiate transaction processing using a user device 110 represented in FIG. 1.

The proof-of-identity 220 may be an input for at least one risk assessment process 230. The risk assessment process may be hosted by at least one computing device represented in FIG. 1 that may be programed or configured by software and algorithms to request and receive a user stored proof-of-identity 280 and user transaction and device history information 285 (collectively referred hereafter to as transaction history 285). The stored proof-of-identity 280 and transaction history 285 may be stored in at least one storage device represented in FIG. 1.

Based on the received proof-of-identity 220, the risk assessment process 230 may determine whether user provided proof-of-identity 220 at least partially matches at least one stored proof-of-identity 280. If the proof-of-identity 220 is not at least partially matched, then the risk assessment process 230 may be programmed or configured to decline user's request for an account or to initiate a transaction. However, if based on at a least partial match of proof-of-identity 220 with at least one proof-of-identity 280, then the risk assessment process 230 may be further programmed or configured to require that a challenge decision 235 be made as to whether or not user 210 needs to respond to a challenge request. If the challenge decision 235 made is to not request a challenge response, then risk assessment process 230 may comprise software or algorithms programmed or configured to instruct at least one one-time transaction identifier generation process 270 to generate at least one one-time transaction identifier. One-time transaction identifier generation process 270 may be hosted on at least one computing device represented in FIG. 1 and comprise software and algorithms to generate the one one-time transaction identifier, in response to which it is communicated to user 210.

The result of the challenge decision 235 may be that a challenge request is to be made, in response to which risk assessment process 230 may be programmed or configured to generate and communicate at least one challenge question 237 to user device 110 to which user 210 must respond. User 210 may submit a challenge response 240 using user device 110, which may be communicated to challenge response processing 250. Challenge response processing 250 may comprise software and algorithms hosted on at least one system 100 computing device. Challenge response processing may involve accessing at least one storage device of system 100, searching for at least one user stored challenge response and, in response to finding at least one user stored challenge response, attempting to at least partially match the at least one stored challenge response with the at least one response 240 provided by user 210 in response to receiving the at least one challenge question 237. The result of challenge response processing 250 may be used as a basis of at least one acceptance decision 260. In response to the challenge response processing 250 resulting in at least a partial match, acceptance decision 260 may instruct one-time transaction identifier generation process 270 to generate at least one a one-time transaction identifier in response to which the at least one one-time transaction identifier may be generated and communicated to user device 110. If challenge response 240 does not result in at least a partial match, then acceptance decision 260 may result in an instruction to risk assessment process 230 to decline the account request or the transaction, in response to which a decline response may be communicated to user device 110.

In addition to determining whether user 210 is at least partially matched and providing its output to challenge decision risk decision 235, risk assessment process 230 may output at least one risk signifier of the degree of risk user 210 represents to the at least one party should the party issue the account or enter into the transaction with user 210. The risk signifier may be based on the user transaction history 285 that may be stored in at least one storage device of system 100.

Risk assessment process 230 may perform instructions to search the at least one system 100 storage device for the user transaction history information 285. If found, transaction history information 285 may be communicated to risk assessment process 230, in response to which it may be used to generate the at least one risk signifier. As described above, the risk signifier may be a score (for example, from 1 to 100), a score expressed as a percentage, a qualifier (for example, high, medium, low), a symbol (for example, a plus sign for acceptable risk, a minus sign for unacceptable risk, or an equal sign for indeterminate or neutral risk), and possible combinations thereof.

One-time transaction identifier generation process 270 may, in addition to sending a one-time transaction identifier to user 210, combine the generated risk signifier with the generated one-time transaction identifier, thereby generating a relying party risk-adjusted indicator. The combination may comprise appending or concatenating, or any combination thereof, the risk signifier to or with the one-time transaction identifier if the risk signifier comprises a symbol or qualifier or mathematically determined score. If the one-time transaction identifier and risk signifier are both numerical, then the combination may comprise performing a mathematical operation that uses each. Examples may include, but not be limited to, raising one to the power of the other, using one as a numerator and the other as a denominator, using one as a multiplicand and the other as a multiplier, combining them in a defined non-linear equation, or any combination thereof. Once determined, a resulting relying party risk-adjusted indicator may be compared to a normalized score (if numerical), interpreted according decision logic in the software and algorithms that may be used by processors evaluating or authorizing a transaction, or any combination thereof.

Once determined, the relying party risk-adjusted indicator may be hashed or otherwise encrypted and communicated to the relying party to the transaction, in response to which the party may use it to either authorize or reject the account or the transaction request depending upon the decision logic, criteria, or any combination thereof that the party-to-the-transaction's at least one computer device's programming or configuration may use.

The hashed or otherwise encrypted risk-adjusted indicator may also be communicated to and stored in a storage device of system 100. As described above, storage of the relying party risk-adjusted indicator may be in accordance with the data structure of the storage device. Storage device databases may include, but not be limited to, a relational, block chain, or distributed ledger, object-oriented, hierarchical, or graphical database, or any combination thereof. As mentioned above, non-limiting expressions, embodiments, or aspects of these types of database structures follow are further described below in the discussion of FIGS. 5A-5E.

As noted above, the user may only receive the one-time transaction identifier without any indication of the risk associated with it. That is, the risk adjustment associated with the one-time transaction identifier that combined comprise the relying party risk-adjusted indicator may only be communicated to and known by the relying party with whom the user's requested transaction may be conducted. The user may not receive or be notified of a degree-of-risk determination or how it is being signified for and/or to the relying party.

Figure 3:
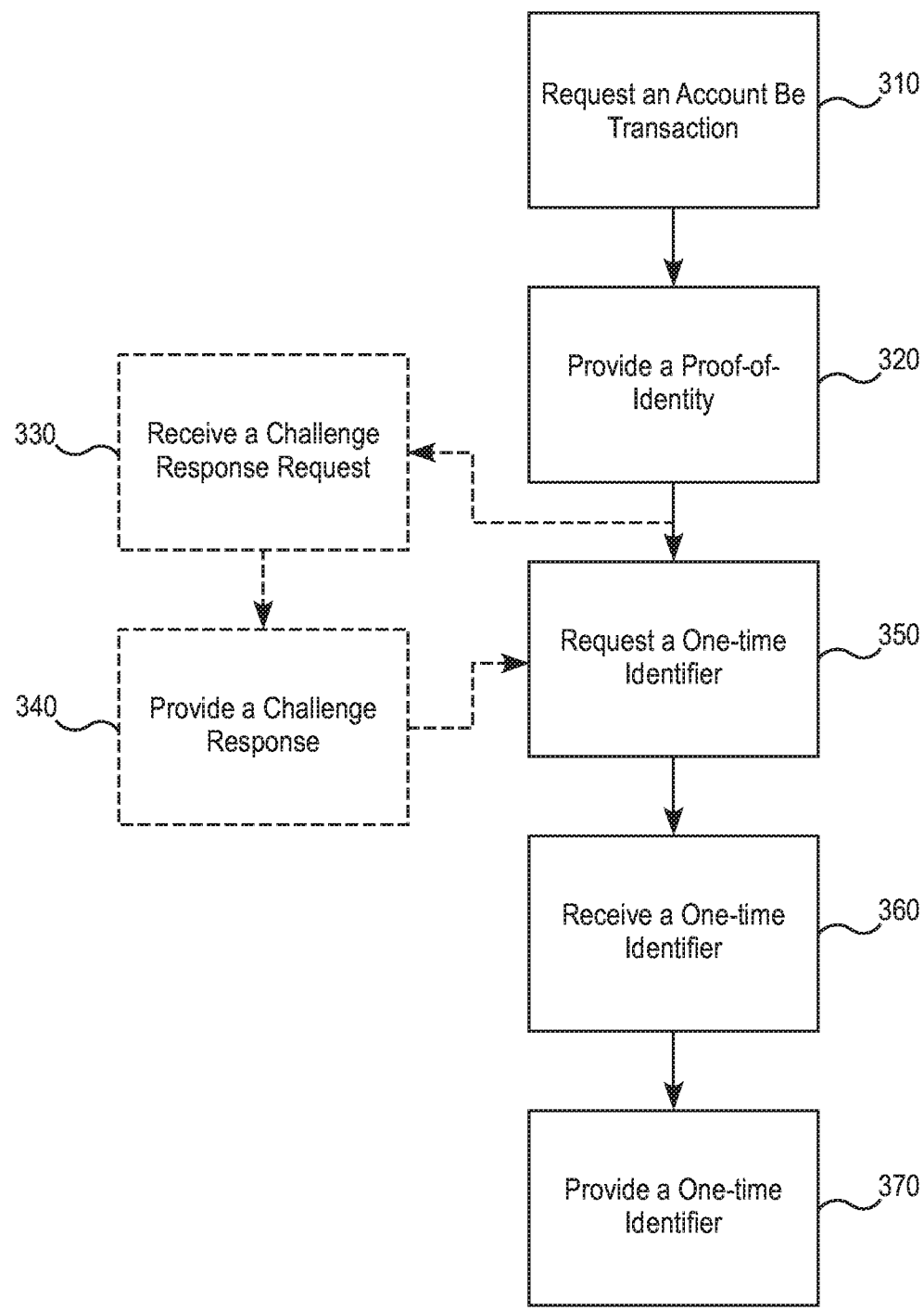
FIG. 3 is a non-limiting expression, embodiment, or aspect of process steps according to the principles of the present disclosure.

According to some non-limiting expressions, embodiments, or aspects, FIG. 3 represents steps at least one user may take to request an account or a transaction using at least one device 110 programmed or configured to generate and communicate the request to at least one processor system 100. In step 310, the at least one user may request that an account be created as one, but not the only, example. In response to the request, the at least one relying party with whom the transaction may occur may generate and communicate a request from transaction processor 120 for at least one user's proof-of-identity from the user. The request may be received by the at least one user through the at least one user's device 110. The at least one user may communicate at least one proof-of identity in step 320, if they have at least one, or by communicating with at least one identity provider, in response to which identity the provider may communicate it to processor system 100, to the at least one user device 110, in response to which the at least one user may communicate it to processor system 100, or any combination thereof. If the communicated at least one proof-of-identity is at least partially matched by processor system 100, then using user device 110, the at least one user may generate and communicate with processor system 100 a request that it generate at least one one-time transaction identifier in step 350. Processor system 100 may be programmed or configured to receive the request, in response to which it may determine and communicate at least one one-time transaction identifier to the at least one user's device 110 which may be programmed or configured to receive it in step 360. If the relying party does not at least partially match the user's-proof-of-identity, then processor system 100 may be programmed or configured to communicate this to the at least one party, who in response may, at its option, communicate with the processor system 100 and request that it generate and communicate at least one challenge question to the at least one user, in response to which it may be programmed and configured to generate and communicate the at least one challenge question to the at least one user whose at least one user device 110 may be programmed or configured to receive the at least one challenge question in step 330. If received, the at least one user may use the at least one user device 110 to input at least one challenge response and communicate it to processor system 100 in step 340, in response to which processor system 100 may be programmed or configured to communicate the at least one challenge response 340 to the at least one party. If the at least one party approves the at least one challenge response 340 and communicates this to processor system 100, processor system 100 may be programmed or configured to communicate the at least one party's approval to the at least one user's at least one user device 110. In response to receiving the at least one party's approval, the at least one user may request at least one one-time-identifier in step 350 using at least one user device 110 programmed or configured to generate and communicate this request to processor system 100. In response to receiving at least one request of at least one one-time transaction identifier, processor system 100's programming or configuration may generate at least one one-time transaction identifier and communicate it to the at least one user. The user may receive the one-time transaction identifier in step 360 on the at least one user device 110. Once the user receives the one-time transaction identifier in step 360, the user may in step 370 input the at least one one-time transaction identifier into the at least one user device 110 and use its programming and configuration to communicate it to processor system 100, in response to which processor system 100 may be programmed or configured to provide it to the at least one party in order to proceed with any further steps needed to conduct the transaction.

Figure 4:
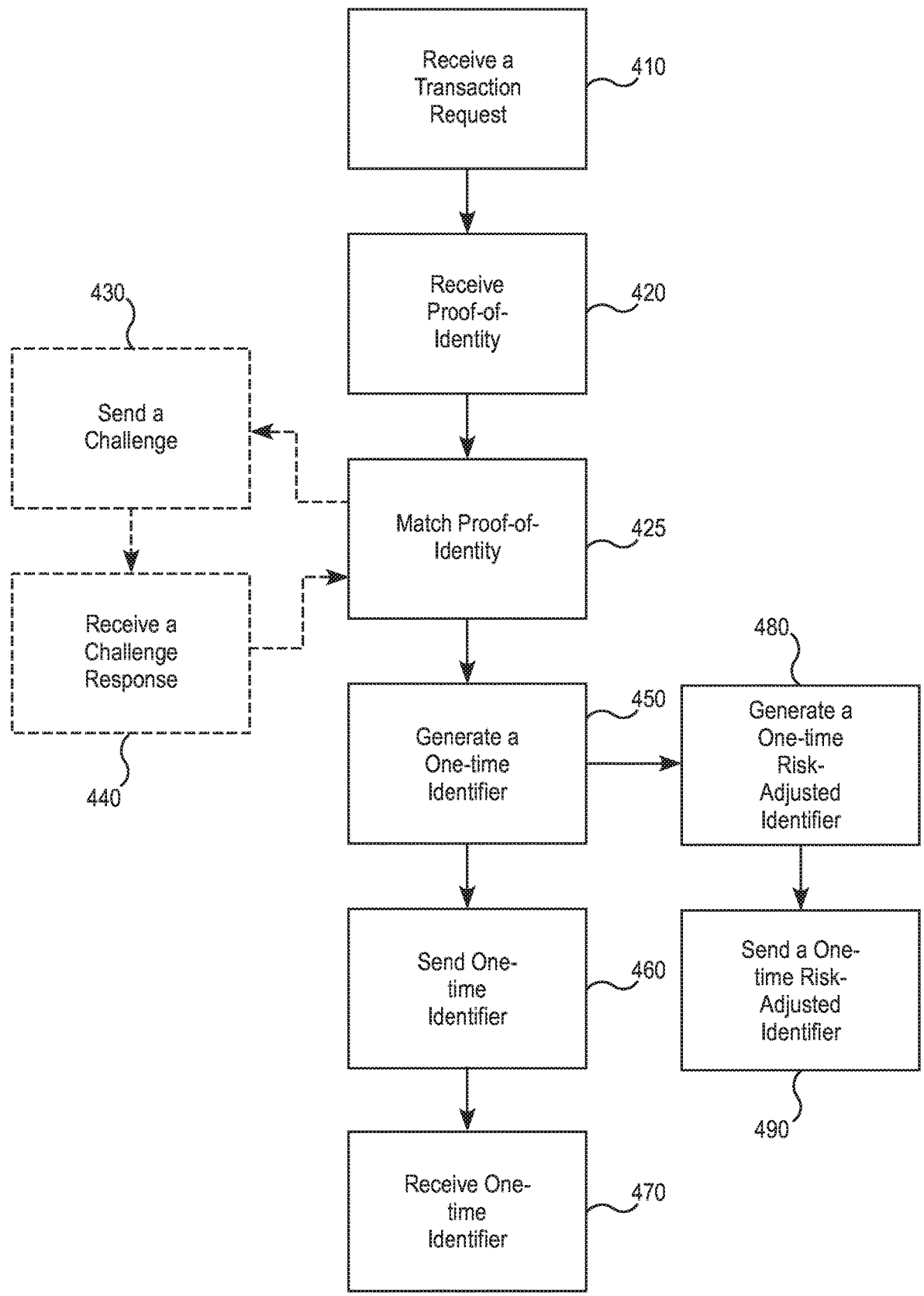
FIG. 4 is a non-limiting expression, embodiment, or aspect of process steps according to the principles of the present disclosure.

According to some non-limiting expressions, embodiments, or aspects, FIG. 4 represents the steps at least one processor system 100 may take when it receives a transaction request from at least one user. In step 410 the at least one processor system may be programmed or configured to receive at least one transaction request from at least one user. In response to receiving the at least one request, processor system 100 may in step 420 be programmed or configured to generate and communicate a request for at least one proof-of-identity from the at least one user on at least one user device 110. If the processor system 100 is not at least one relying party's, but rather operates on behalf of the at least one relying party, then the at least one processor system 100 also may be programmed or configured to communicate the request to the at least one relying party to the transaction who may, in response to receiving the request, communicate back to the at least one processor 100 that it request at least one proof-of-identity of the at least one user, in response to which it may generate and communicate the at least one request to the user on at least one user device 110.

If the at least one processing system 100 is programmed or configured to receive and does receive at least one of the user's at least one proof-of-identity, then in step 425 the processor system 100 may be programmed or configured to process the received at least one proof-of-identity and determine if it at least partially matches the at least one of the user's proof-of-identity that may be stored in processor system 100. If the at least one processor system 100 determines that there is at least a partial match, it may be programmed or configured to accept the proof-of-identity, in response to which may be programmed or configured to generate at least one one-time transaction identifier in step 450 and then to communicate the at least one one-time transaction identifier to the user in step 460, who may receive it on at least one user device 110.

If the at least one processor system 100 does not at least partially match the at least one user's proof-of-identity with one stored in processor system 100, then the at least one processor system 100 may be programmed or configured to optionally generate and communicate at least one challenge to the user in step 430. The at least one processor system 100 also may be programmed or configured in step 430 to send its determination that the received at least one proof-of-identity did not at least partially match at least one user's stored proof-of-identity to the relying party, in response to which, at its discretion, the at least one party may communicate with the at least one processor system 100 and instruct that it generate and communicate at least one challenge request to the at least one user on the at least one user device 110.

Upon receiving the at least one challenge, the at least one user may input at least one challenge response into at least one user device 110 which may be programmed or configured to communicate it to the at least one processor system 100.

The at least one processor system 100 may be programmed or configured to receive the at least one challenge response in step 440 to determine if it at least partially matches the at least one challenge response stored in at least one of its storage devices. If it determines that there is at least one partial match, then in step 440 the at least one processor system 100 may be programmed or configured to generate and communicate at least one one-time transaction identifier to the at least one user on at least one user device 110 in steps 450 and 460, respectively.

Whenever the at least one user receives at least one one-time transaction identifier, the user may input it into the at least one user device 110, wherein the at least one user device 110 may be programmed to communicate it to the at least one processor system 100. Processor system 100 may be programmed or configured to receive the at least one one-time transaction identifier in step 470, wherein it may be used to determine if the at least one user's transaction request may be approved or denied. This determination may be made using the output of steps 480 and 490.

In steps 480 and 490, processor system 100 may be programmed or configured to determine and communicate, respectively, at least one relying party risk-adjusted indicator to the at least one relying party to the transaction further in response to which the at least one relying party to the transaction may determine to proceed to conduct the at least one transaction or to decline the at least one transaction.

Note that unless otherwise noted, the at least one processor system 100 may be that of the relying party to the transaction or at least one other relying party's system that is accessed by and in communication with the at least one party to the transaction.

Figure 5C:
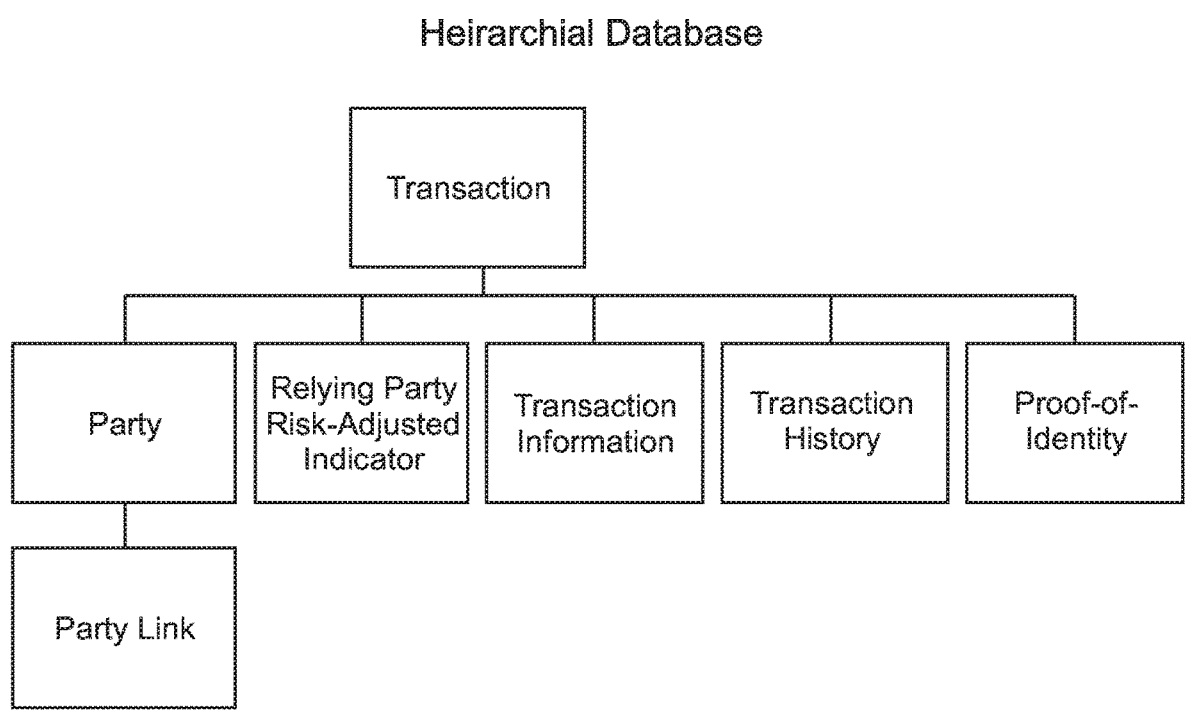
Figure 5D:
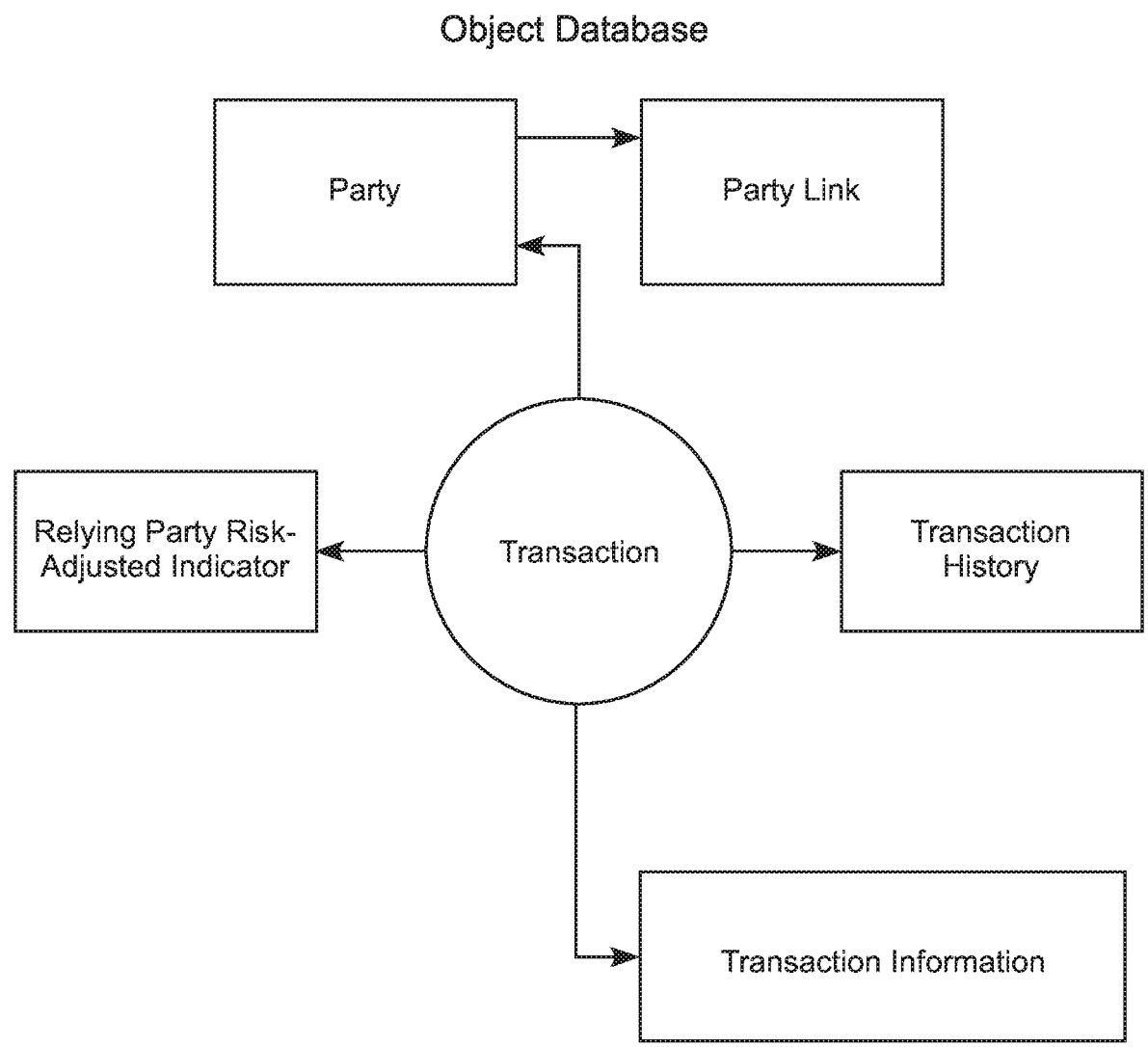
Figure 5E:
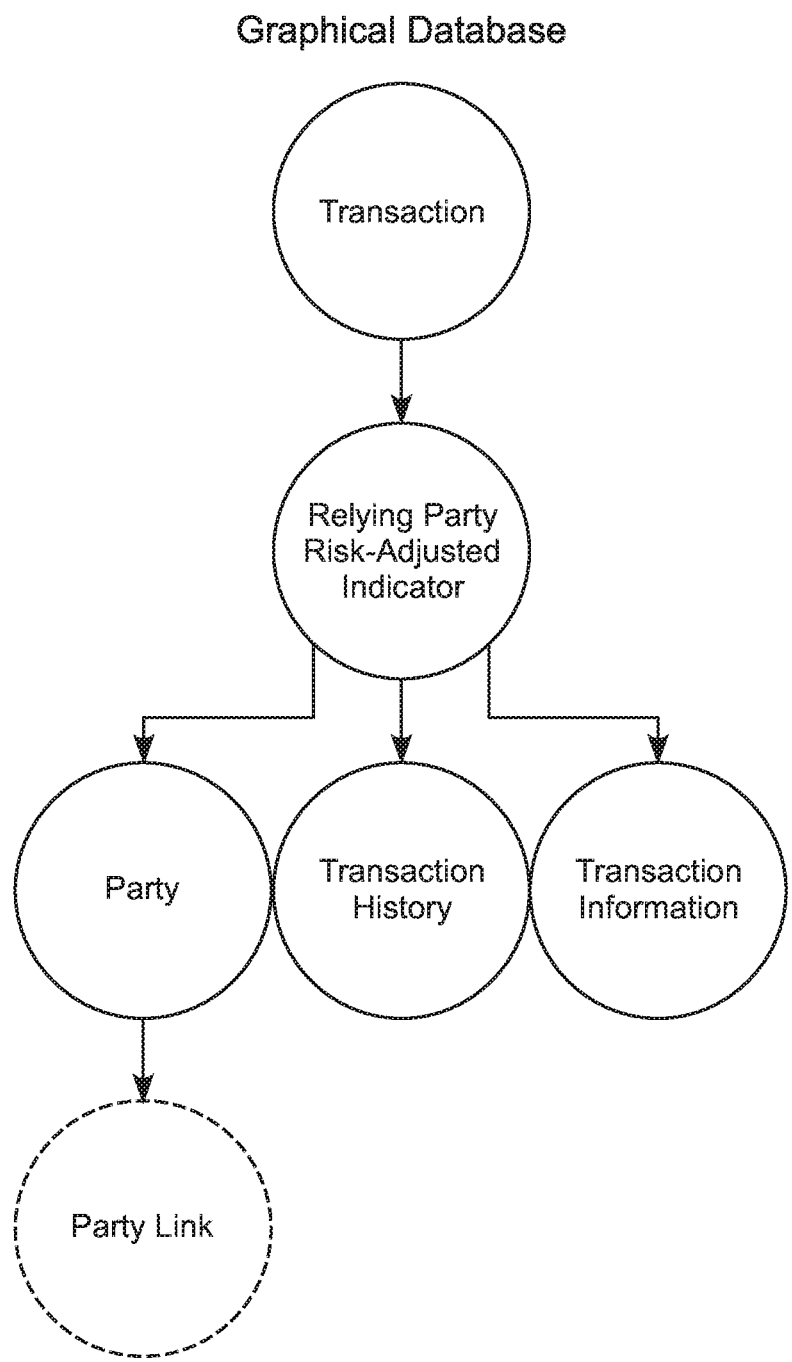

According to some non-limiting expressions, embodiments, or aspects, FIGS. 5A-5E depict data structures that may be used by a relying party to store a user's at least one relying party risk-adjusted indicator and associated information. The records depicted in FIGS. 5A-5E may store the user's information from the at least one proof-of-identity the user 210 provides to the party and the transaction history underlying the risk adjustment made for the at least one relying party risk-adjusted indicator for a transaction that the relying party may accept, deny, initiate, enter into with user 210, or any combination thereof. For example, if a block chain structure like the one illustrated in FIG. 5A may be used, then the at least one relying party risk-adjusted indicator may be stored as at least one block of a block chain, wherein the user's proof-of-identity, transaction history, transaction information (which may include, but not be limited to, the transaction type, amount, time, and location), and the party to the transaction are also represented in the block of the block chain. As relational elements in a relational database, like the one represented in FIG. 5B, the at least one relying party risk-adjusted indicator may be stored with pointers to the user, the user's at least one proof-of-identity, transaction history, and the party to the transaction, each of which may be separately stored in the same or different system 100 storage device(s). If stored in hierarchical, object, or graphical databases, then the transaction may comprise a data item to which the user's at least one relying party risk-adjusted indicator, proof-of-identity, transaction history, and party to the transaction may roll up to or be linked, as depicted in FIGS. 5C, 5D, and 5E, respectively.

Note that the illustrative databases shown in FIGS. 5A-5E may be used in various combinations and as centralized or distributed database structures within one or more system storage devices and that they are not meant to exclude the use of other structures that may be available, become available, be developed or enhanced in the future, or any combination thereof.

Figure 6:
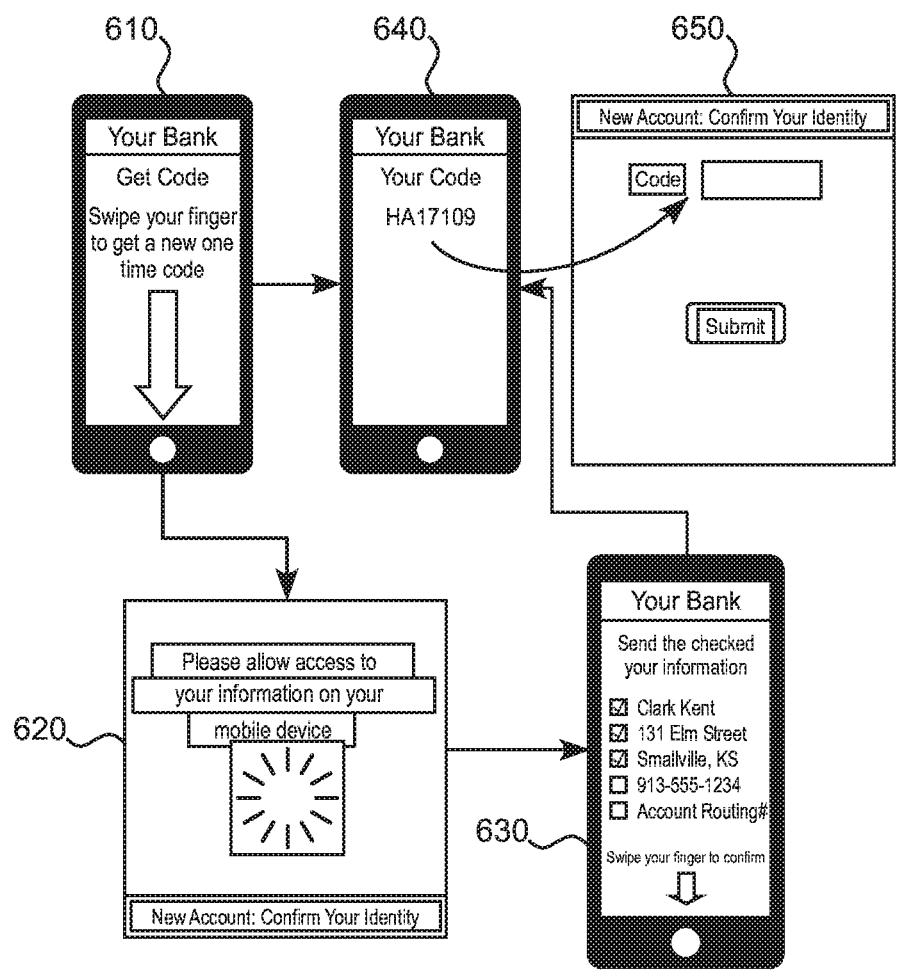
FIG. 6 is a non-limiting expression, embodiment, or aspect of a user interaction according to the principles of the present disclosure.

According to some non-limiting expressions, embodiments, or aspects, FIG. 6 illustrates certain interactions that at least one user may have with at least one processor or at least one relying party in communication with the at least one processor, or any combination of thereof using at least one user device, in this case a mobile phone. On at least one screen 610 of the at least one user device, a user may input at least one request to enter into or conduct a transaction and request an at least one one-time transaction identifier. The at least one processor or party then may send a message that may be displayed on at least one screen 620 to the at least one user asking for at least one proof-of-identity. If at least one proof-of-identity is available on the at least one user's mobile device, the at least one user may send a message authorizing which specific at least one proof-of-identity may be sent by making inputs on at least one screen 630, for example, by making check-marks in check-boxes on screen 630 to specify the at least one proof-of-identity or assertion based proofs-of-identity that the at least one user approves to be sent to the at least one processor or party as an assertion profile and by leaving unchecked check-boxes on screen 630 for the at least one proof-of-identity that may not be authorized to be sent to the at least one processor or party. If the at least one proof-of-identity is not stored on the at least one user's phone, but is stored with the processor or the relying party, the at least one user may use at least one screen 630 to authorize what information may be authorized by the party or communicated to the party by the processor, or any combination thereof.

If the at least one processor or party may at least partially match the user on the basis of the at least one authorized proof-of-identity the user sends, or has sent, with at least one proof-of-identity the processor or party stores in at least one of their storage devices, for example, a processor's processor system storage devices 130 or 160 shown in FIG. 1, the at least one processor or party may send the user a one-time transaction identifier, in this case a code in message sent to and displayed on at least one screen 640, in response to which the at least one user may enter this code into a text field on at least one screen 650 and communicate it back to the processor or to the party to confirm their identity. Upon receiving the at least one one-time transaction identifier from the at least one user, the processor or party may approve or reject proceeding with the at least one transaction on the basis of at least one relying party risk-adjusted indicator that may be generated for, communicated to, and used by the relying party (not shown), but which is not sent to the at least one user.

Figure 7:
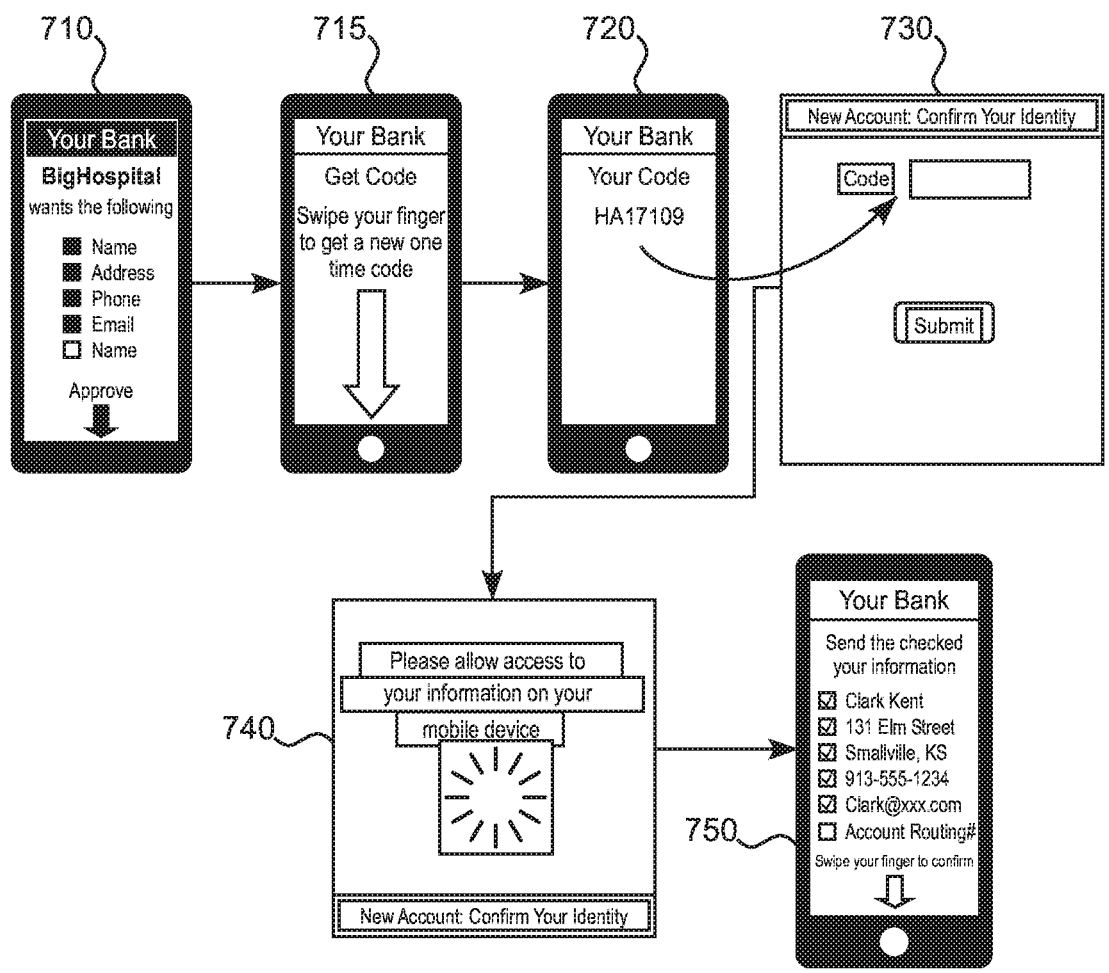
FIG. 7 is a non-limiting expression, embodiment, or aspect of a user interface according to the principles of the present disclosure.

FIG. 7 is a non-limiting illustration showing that the at least one user may receive on least one user device screen 710 a request from at least one identity service, in this case a bank, to approve it communicating at least one proof-of-identity to at least one relying party, in this case a hospital. The at least one identity service may then send at least one instruction presented on at least one user device screen 715, wherein the instruction is for the user to request at least one one-time transaction identifier. In response to the at least one user following the instruction presented on screen 715, the identity server may communicate at least one one-time transaction identifier as a code to the user device which it displays on at least one screen 720. If the at least one user inputs the at least one-time transaction identifier on at least one screen 730, the user's device may communicate it to the at least one identity service, which may result in a display on at least one user device screen 740 that may indicate that the service is obtaining information that may need to be authorized and communicated to the at least one relying party.

If the required risk information may be available, the at least one identity service may communicate specific proof-of-identify information that may be authorized and communicated to the at least one relying party. The available information may be presented on the at least one user's device as at least one screen 750. The at least one communication of available proof-of concept information may be communicated to the at least one user's device in a variety of ways including, but not limited to, a push notification to the user's mobile application.

As an example, the at least one user device screen 750 may show the at least one user proof-of-identity information that may be available to communicate to the at least one requesting relying party and for which the at least one user may or may not confirm his or her permission to communicate to the relying party. An option may allow the user to select which information may be shared with the at least one relying party, like an address, bank number, or assertions related to such information, or any combination thereof. For example, screen 750 exemplifies information that the user may authorize to communicate to the relying party or may be used as the basis of an assertion profile to be communicated to the at least one relying party.

As shown on the at least one screen 750, the user may put check-marks in check-boxes to indicate the information that he or she authorizes the at least one identity service to communicate to the at least one relying party and may leave unchecked the check-boxes for the information that the user does not authorize be sent to the relying party.

In some non-limiting expressions, embodiments, or aspects, the user updates old information within the application before a response may be communicated to a relying party. In some non-limiting expressions, embodiments, or aspects, the data required may be specific to the type of account being requested or to the transaction to be entered into. In this sense, the required information may be considered dynamic.

In some non-limiting expressions, embodiments, or aspects, the at least one identity service may communicate to the at least one user the name of at least one relying party along with the at least one proof-of-identity required to enter into or conduct a transaction, in response to which the user may authorize what at least one proof-of-identity may and may not be provided to the at least one requesting party (not shown).

In some non-limiting expressions, embodiments, or aspects, the at least one user's at least one proof-of-identity information that may be used as an aspect of a user's identity or may be used to enable an identity service or relying party to use the user's proof-of-identity information may include a user's biometric (which may include, but not be limited to, a fingerprint, voice recognition, face recognition, iris recognition, and/or the like), a PIN, a password, or any combination thereof.

In some non-limiting expressions, embodiments, or aspects, the at least one user making at least one proof-of-identity request of the at least one identity service may have been vetted previously by the at least one identity service, in response to which it may have provided at least one encrypted token to the at least one user to validate himself or herself when making at least one proof-of-identity request. They may use such tokens to thwart attempts by a fraudster to spoof a relying party insofar as the fraudster may not have access to a token and may not be granted a one-time code to the identity service without using at least one valid token.

As it may pertain to FIG. 6 and FIG. 7, it is worth noting that the steps depicted in FIG. 3 and FIG. 4 remain relevant, if some of the steps may be reordered. For example, steps 320 and 350 in FIG. 3 may be transposed to reflect that a user may request a one-time transaction identifier before a proof-of-identity may be provided to or accessed by at least one processor system 100 or party, or any combination thereof. Similarly, steps 450, 460, and 470 in FIG. 4 may occur after step 410 if a code may be provided to at least one user in advance of its receiving or accessing at least one user's proof-of-identity.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A relying party risk-adjusted indicator generation system, comprising:
   at least one computing device programmed or configured to:
      receive at least one account or transaction request from at least one user to enter into a transaction with at least one relying party;
      receive at least one proof-of-identity from the at least one user;
      generate at least one one-time transaction identifier;
      access data associated with the at least one user;
      generate at least one risk signifier associated with the at least one user based on the accessed data;
      generate at least one relying party risk-adjusted indicator comprising the at least one risk signifier and the at least one one-time transaction identifier;
      communicate the at least one one-time transaction identifier to the at least one user; and
      communicate the at least one relying party risk-adjusted indicator to the at least one relying party to the transaction.

2. The relying party risk-adjusted indicator generation system of claim 1, wherein the at least one computing device of the relying party risk-adjusted indicator generation system is programmed or configured to:
   receive the at least one one-time transaction identifier from the at least one user; and
   authenticate the at least one user and proceed with the at least one transaction.

3. The relying party risk-adjusted indicator generation system of claim 1, wherein the at least one transaction comprises at least one of the following: requesting an account, conducting a transaction, or any combination thereof.

4. The relying party risk-adjusted indicator generation system of claim 1, wherein the at least one risk signifier is based on at least one of the following: at least one device fingerprint, at least one location, at least one transaction history, at least one risk score from at least one risk model, at least one assertion profile associated with the at least one user, at least a partial match of the at least one proof-of-identity provided by the at least one user with at least one stored proof-of-identity previously received from the at least one user, or any combination thereof.

5. The relying party risk-adjusted indicator generation system of claim 1, wherein the at least one risk signifier is communicated as at least one of the following appended to or concatenated with a one-time transaction identifier: a number, an alphanumeric, a symbol, a minus sign, a plus sign, an equal sign, or any combination thereof.

6. The relying party risk-adjusted indicator generation system of claim 1, wherein the at least one one-time transaction identifier and the at least one risk signifier are both numbers, which are combined to determine or generate the relying party risk-adjusted indicator using at least one of the following: multiplication, division, addition, a non-linear expression, a result normalized in relation to a predefined scale, a hashed number, an encrypted number, or any combination thereof.

7. The relying party risk-adjusted indicator generation system of claim 1, wherein the data associated with the at least one relying party risk-adjusted indicator is stored in at least one of the at least one computing device's storage devices in at least one of the following: on a block chain, in a relational database, a hierarchical database, an object-oriented database, a graphical database, or any combination thereof.

8. The relying party risk-adjusted indicator generation system of claim 1, wherein the at least one proof-of-identity comprises at least one of the following: at least one device identifier, a device fingerprint, a phone number, a location identifier, a home, a business, a mailing address, an assertion profile, at least one assertion known or not known about the user, a government identifier, a social security number, a driver's license, an authorized photo, a passport, a government furnished identity card or tag, or any combination thereof.

9. The relying party risk-adjusted indicator generation system of claim 1, wherein the at least one risk signifier comprises output of at least one risk model computing the risk of the at least one transaction using at least one of the following: at least one user's payment, an agreement, an assertion, a compromise-event reference identifier, a compromise event history, data from at least one risk source, a credit bureau, a government agency or department, or any combination thereof.

10. The relying party risk-adjusted indicator generation system of claim 1, wherein the at least one computing device of the relying party risk-adjusted indicator generation system is programmed or configured to generate a relying party risk-adjusted indicator by combining the at least one one-time transaction identifier with a risk signifier associated with the risk the at least one user poses to the at least one relying party for the at least one transaction to be conducted.

11. A relying party risk-adjusted indicator generation method, comprising:
   receiving, with at least one computing device, at least one account or transaction request from at least one user to enter into at least one transaction with at least one party;
   receiving, with at least one computing device, at least one proof-of-identity from the at least one user;

generating, with at least one computing device, at least one one-time transaction identifier;

accessing, with at least one computing device, data associated with the at least one user;

generating, with at least one computing device, at least one risk signifier associated with the data;

generating, with at least one computing device, at least one relying party risk-adjusted identifier comprising the at least one risk signifier and the at least one one-time transaction identifier;

communicating, with at least one computing device, the at least one one-time transaction identifier to the at least one user; and communicating, with at least one computing device, the at least one relying party risk-adjusted indicator to the at least one relying party to the transaction.

12. The relying party risk-adjusted indicator generation method of claim 11, further comprising generating, with at least one computing device, a relying party risk-adjusted indicator by combining the at least one one-time transaction identifier with at least one risk signifier associated with the risk the at least one user poses to the relying party for the at least one transaction to be conducted.

13. The relying party risk-adjusted indicator generation method of claim 11, wherein the at least one risk signifier is based on at least one of the following: at least one device fingerprint, a location, at least one transaction history, at least one risk score from at least one risk model, at least one assertion profile associated with the at least one user, at least a partial match of the at least one proof-of-identity that the at least one user provides with at least one stored proof-of-identity previously received from the at least one user, or any combination thereof.

14. The relying party risk-adjusted indicator generation method of claim 11, wherein the at least one risk signifier is communicated as at least one of the following appended to or concatenated with a one-time transaction identifier: a number, an alphanumeric, a symbol, a minus sign, a plus sign, an equal sign, or any combination thereof.

15. The relying party risk-adjusted indicator generation method of claim 11, wherein the at least one one-time transaction identifier and the at least one risk signifier are both numbers, which are combined to determine or generate at least one relying party risk-adjusted indicator using at least one of the following: multiplication, division, addition, a non-linear expression, a result normalized in relation to a predefined scale, a hashed number, an encrypted number, or any combination thereof.

16. The relying party risk-adjusted indicator generation method of claim 11, wherein the data associated with the at least one relying party risk-adjusted indicator is stored in the at least one computing device's storage device in at least one of the following: on a block chain, in a relational database, a hierarchical database, an object-oriented database, a graphical database, or any combination thereof.

17. The relying party risk-adjusted indicator generation method of claim 11, wherein the at least one proof-of-identity comprises at least one of the following: at least one device identifier, a device fingerprint, a phone number, a location identifier, a home, a business, a mailing address, an assertion profile, at least one assertion known or not known about the user, a government identifier, a social security number, a driver's license, an authorized photo, a passport, a government furnished identity card or tag, or any combination thereof.

18. The relying party risk-adjusted indicator method of claim 11, wherein the at least one risk signifier comprises output of at least one risk model computing the risk of the at least one transaction using at least one of the following: at least one user's payment, an agreement, an assertion, a compromise-event reference identifier, a compromise event history, data from at least one risk source, a credit bureau, a government agency or department, or any combination thereof.

* * * * *